Sept. 17, 1929.   R. S. SANFORD   1,728,632
DRUM MOUNTING
Original Filed Aug. 15, 1927
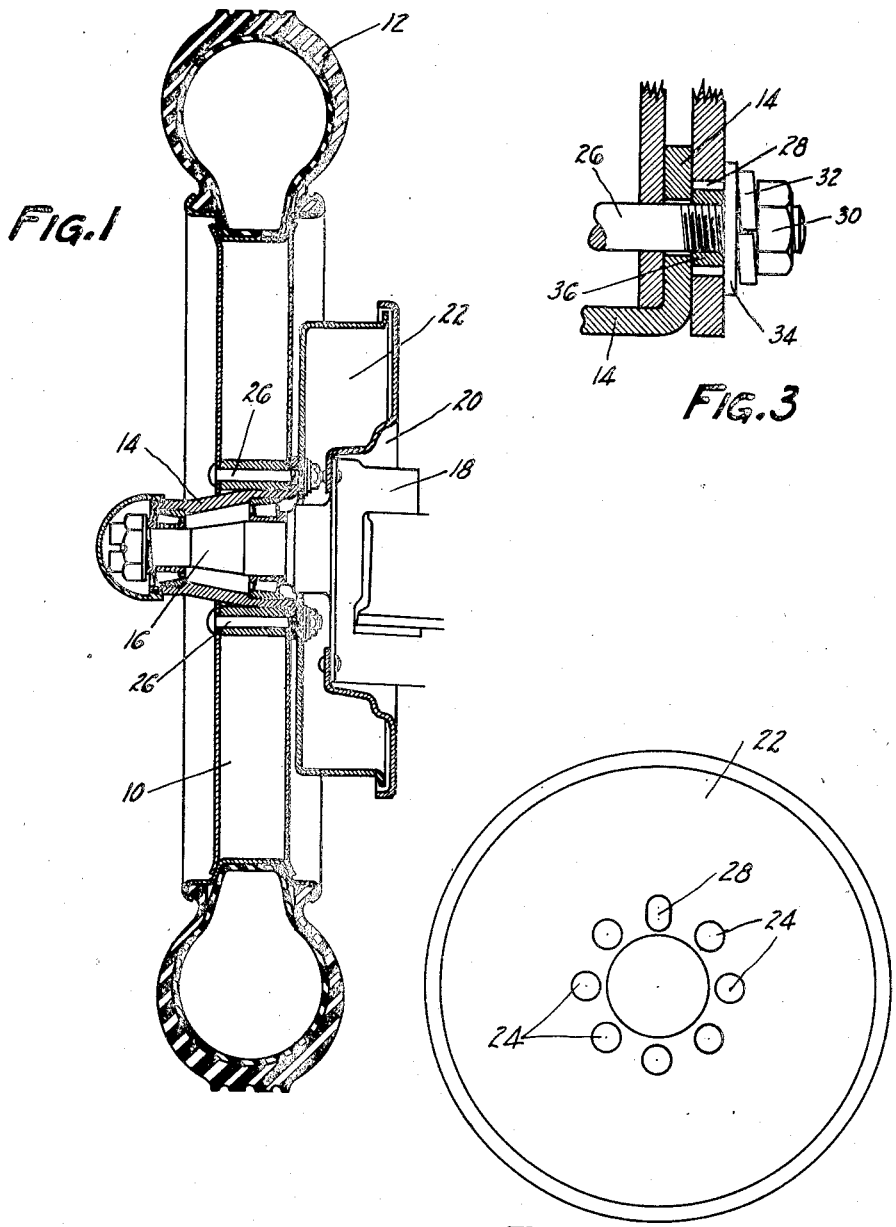
INVENTOR
ROY S. SANFORD
BY
ATTORNEY Patented Sept. 17, 1929

1,728,632

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

DRUM MOUNTING

Application filed August 15, 1927, Serial No. 213,178. Renewed November 14, 1928.

This invention relates to mountings for brake drums and the like, and is illustrated as embodied in the mounting of a brake drum on an automobile wheel. An object of the invention is to facilitate the adjustment of the drum to make it co-axial with respect to the wheel, by mounting it in such a manner that the application of the brake when the wheel is rotating will cause the drum to center itself automatically. Preferably the head of the brake drum is provided with an annular series of openings for the brake drum fastenings, the openings being somewhat larger than the fastenings so that the drum can shift slightly to center itself, one of the openings being sufficiently narrow and elongated so that it has driving engagement with its fastening. Preferably the fastenings carry friction clamping devices such as friction washers held by nuts threaded on the ends of the fastenings and which hold the drum when it has centered itself as described above.

The above and other objects and features of the invention will be apparent from the following description of one illustrative embodiment shown in the accompanying drawing, in which:

Figure 1 is a vertical section through one front wheel of an automobile and through the brake drum, showing the mounting of the drum on the wheel;

Figure 2 is an outside elevation of the drum, that is, looking from the left in Figure 1, before it is attached to the wheel; and Figure 3 is a detailed section through one of the fastenings on a larger scale than Figure 1.

In the arrangement illustrated the wheel 10 carries the usual inflatable tire 12 and is fastened in any suitable manner to a hub 14 rotating on a spindle 16 projecting from a front wheel knuckle 18. The knuckle 18 or its equivalent also carries the backing plate 20 on which the brake (not shown) is mounted.

The drum 22 may be of any usual or desired form and is shown as formed with a cylindrical braking flange projecting away from the wheel and with a generally plane head substantially parallel to the wheel. According to an important feature of the present invention, the head of the drum 22 is formed with an annular series of openings 24 for the bolts 26 or other fastenings securing the drum to the wheel 10. All but one of the openings 24 are somewhat larger than the fastenings 26, so that it is possible to shift the drum slightly with respect to the fastenings. One of the openings, shown at 28 in Figure 2, is slightly narrower than the openings 24 and has driving engagement with opposite sides of its fastenings 26. This opening 28 is somewhat elongated radially of the wheel so that it permits shifting of the drum with respect to its fastening 26, so long as the shifting is substantially along the radius passing through the opening 28 or is an angular movement about an axis passing through the opening 28.

Each of the fastenings 26 is provided with friction means clamping the drum 22 to the wheel tightly enough to prevent movement except when considerable pressure is applied. The illustrated friction means includes a nut 30 threaded on the end of the fastening against a spring lock-washer 32 holding a friction washer 34 against the head of the brake drum. A spacer 36 may be provided if desired to limit distortion of the washer 34.

In operation, all of the nuts 30 are drawn up quite tightly so that the drum can shift with respect to its fastenings only when a very great force is applied. The brake (not shown) is mounted on the backing plate 20, and as this brake has previously been adjusted to be substantially coaxial with respect to wheel 10, when it is applied it tends to shift the drum 22 into a position where it is also co-axial with respect to the wheel. Sufficient force is now applied to the wheel to force it to turn against the resistance of the brake, this force being sufficient to cause the slight shifting necessary to center the brake drum. The friction devices 30 and 34 thereafter hold the brake drum against further shifting.

While one illustrative embodiment has been described in detail, it is not my intention to limit the scope of the invention to that particular embodiment or otherwise than by the terms of the appended claims.

I claim:

1. A brake drum mounting comprising, in combination, a rotatable part, a brake drum having a head adjacent said part and formed with an annular series of openings through said head, one of which is elongated along a radius of the drum and is narrower than the other openings at right angles to said radius, and fastenings passing through the openings and which secure the drum to said part, the fastenings being smaller than their openings except that the one passing through the elongated opening is substantially equal in diameter to the shorter dimension of said opening so that it has driving engagement with the sides of the elongated opening.

2. A brake drum mounting comprising, in combination, a rotatable part, a brake drum having a head adjacent said part and formed with an annular series of openings through said head, one of which is elongated along a radius of the drum and is narrower than the other openings at right angles to said radius, fastenings passing through the openings and which secure the drum to said part, the fastenings being smaller than their openings except that the one passing through the elongated opening is substantially equal in diameter to the shorter dimension of said opening so that it has driving engagement with the sides of the elongated opening, and friction holding means associated with each fastening and permitting the drum to shift slightly to center itself when the brake is applied.

3. The method of positioning a brake drum with respect to its wheel which comprises mounting the drum upon the wheel in such manner that it may be subsequently shifted with respect thereto, then applying a braking means to contact the drum and prevent normal rotative movement thereof and lastly rotating said drum against the resistance of said brake to automatically force the drum into concentric relation with respect to the brake and wheel.

4. A vehicle wheel assembly comprising, in combination, a revolvable wheel part, a brake drum having a head adjacent said part and secured thereto by fastenings passing through said wheel and enlarged openings in said drum head, one of said openings being elongated along a radius of the drum and of such width as to have a driving fit with its fastening, which opening, together with the remaining openings, is so constructed and arranged with respect to the associated wheel parts as to permit the drum to have an angular movement about an axis passing through the elongated opening.

5. A brake drum characterized by a head provided with a plurality of openings adjacent a central opening therein, one of said openings being elongated radially of said drum.

In testimony whereof, I have hereunto signed my name.

ROY S. SANFORD.